(12) United States Patent
Malik et al.

(10) Patent No.: US 12,443,428 B2
(45) Date of Patent: Oct. 14, 2025

(54) SYSTEM AND METHOD FOR CLOUD-BASED ANOMALY DETECTION AND ALERTING FOR STREAMING DATA

(71) Applicant: AT&T Intellectual Property I, L.P., Atlanta, GA (US)

(72) Inventors: Rajat Malik, Metuchen, NJ (US); Tamraparni Dasu, New Vernon, NJ (US); Yaron Kanza, Fair Lawn, NJ (US); Divesh Srivastava, Summit, NJ (US); Eleftherios Koutsofios, Berkeley Hts, NJ (US); Gordon Woodhull, Beacon, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 656 days.

(21) Appl. No.: 17/717,369

(22) Filed: Apr. 11, 2022

(65) Prior Publication Data

US 2023/0325226 A1  Oct. 12, 2023

(51) Int. Cl.
  *G06F 9/455*  (2018.01)
(52) U.S. Cl.
  CPC .. *G06F 9/45558* (2013.01); *G06F 2009/4557* (2013.01); *G06F 2009/45595* (2013.01)
(58) Field of Classification Search
  None
  See application file for complete search history.

(56) References Cited

U.S. PATENT DOCUMENTS

| | | |
|---|---|---|
| 2014/0078151 A1 | 3/2014 | Garr et al. |
| 2015/0169142 A1 | 6/2015 | Longo et al. |
| 2019/0042887 A1* | 2/2019 | Nguyen ............... G06F 18/2148 |
| 2020/0042373 A1* | 2/2020 | Przestrzelski ....... G06F 11/0709 |
| 2021/0144164 A1* | 5/2021 | Mathur ................... H04L 67/10 |
| 2022/0250328 A1 | 8/2022 | Buller et al. |
| 2023/0297645 A1 | 9/2023 | Dasu et al. |

(Continued)

OTHER PUBLICATIONS

"Elki", Wikipedia, printed Mar. 2022, 7 pages.
(Continued)

*Primary Examiner* — Eric C Wai
(74) *Attorney, Agent, or Firm* — Guntin & Gust, PLC; Erik Boyd

(57) ABSTRACT

Aspects of the subject disclosure may include, for example, detecting data streams by a processing system including a processor, wherein the processing system is associated with an anomaly detection and alerting system in which stream processing and model maintenance is decoupled from one another, and wherein one or more dedicated virtual machines (VMs) store and maintain anomaly detection and alerting models, based on the detecting, causing, by the processing system, a plurality of stream-processing VMs to be instantiated for processing the data streams, and managing, by the processing system, data stream assignments for the plurality of stream-processing VMs based on monitoring of one or more conditions, wherein the plurality of stream-processing VMs process assigned data streams by executing instances of the anomaly detection and alerting models, and provide model outputs to the one or more dedicated VMs for updating of the anomaly detection and alerting models. Other embodiments are disclosed.

20 Claims, 15 Drawing Sheets

(56) References Cited

U.S. PATENT DOCUMENTS

| | | |
|---|---|---|
| 2023/0300785 A1 | 9/2023 | Koutsofios et al. |
| 2023/0325064 A1 | 10/2023 | Woodhull et al. |

OTHER PUBLICATIONS

"Scikit-learn", Wikipedia, printed Mar. 2022, 3 pages.
"Weka (machine learning)", Wikipedia, printed Mar. 2022, 4 pages.
Dasu, Tamraparni, et al., "Don't Cry Wolf", Conference Paper, Oct. 2019, 3 pages.
Brown, P.E. et al., "Don't Cry Wolf", Oct. 5-8, 2019 IEEE International Conference on Data Science and Advanced Analytics (DSAA), 4 pgs.

* cited by examiner

210

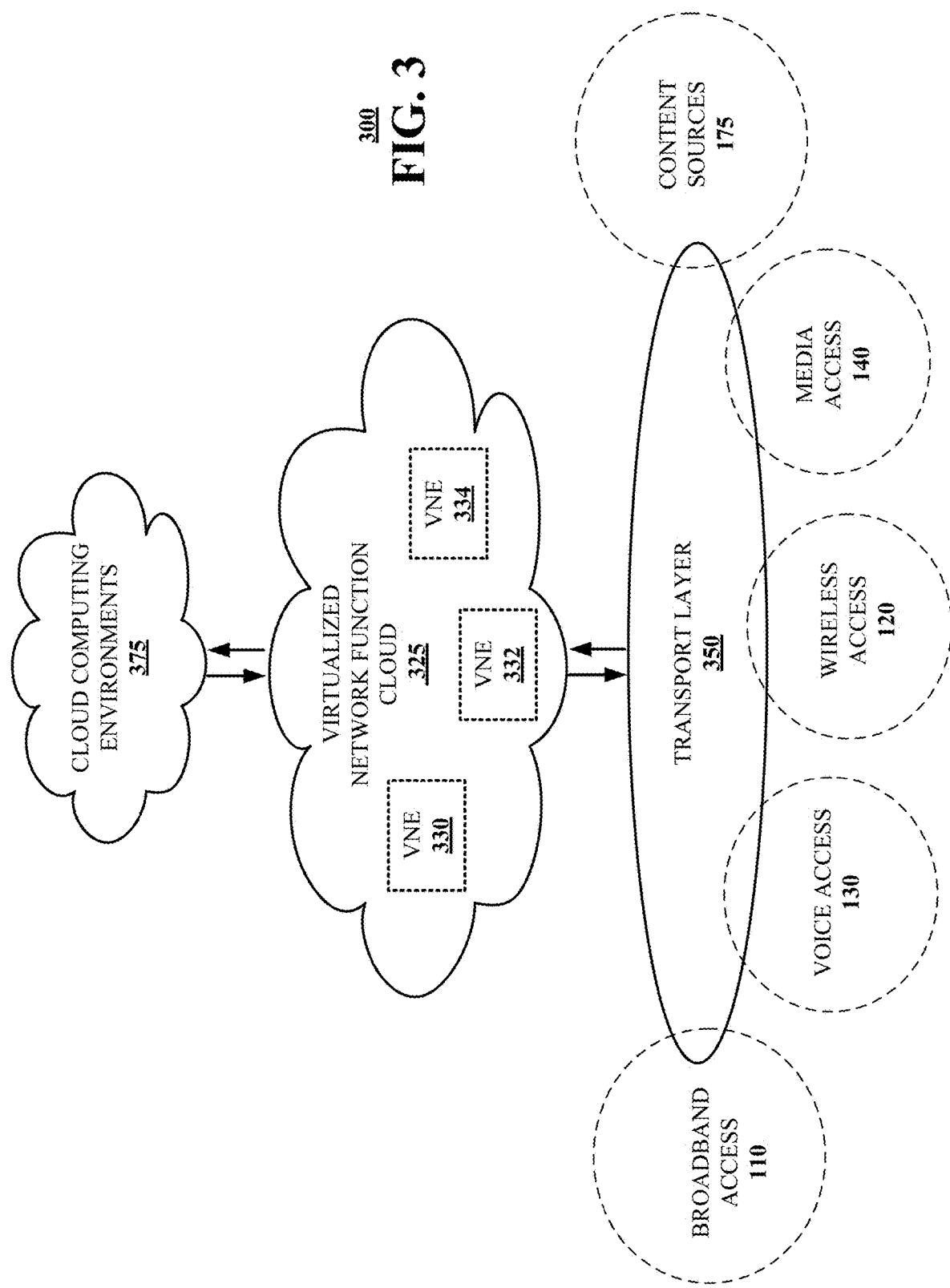

SYSTEM AND METHOD FOR CLOUD-BASED ANOMALY DETECTION AND ALERTING FOR STREAMING DATA

FIELD OF THE DISCLOSURE

The subject disclosure relates to cloud-based anomaly detection and alerting for streaming data.

BACKGROUND

As the number (and variety) of complex systems deployed on the cloud continues to rise, the need for effective monitoring of these systems will only increase. For instance, it can be vital to monitor the flow of data streams between on-premises applications and the cloud, monitor content delivery networks, manage streaming data that feeds data lakes, and address or prevent anomalies in data streams that feed critical machine learning (ML) applications.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communications network in accordance with various aspects described herein.

DETAILED DESCRIPTION

Figure 1:
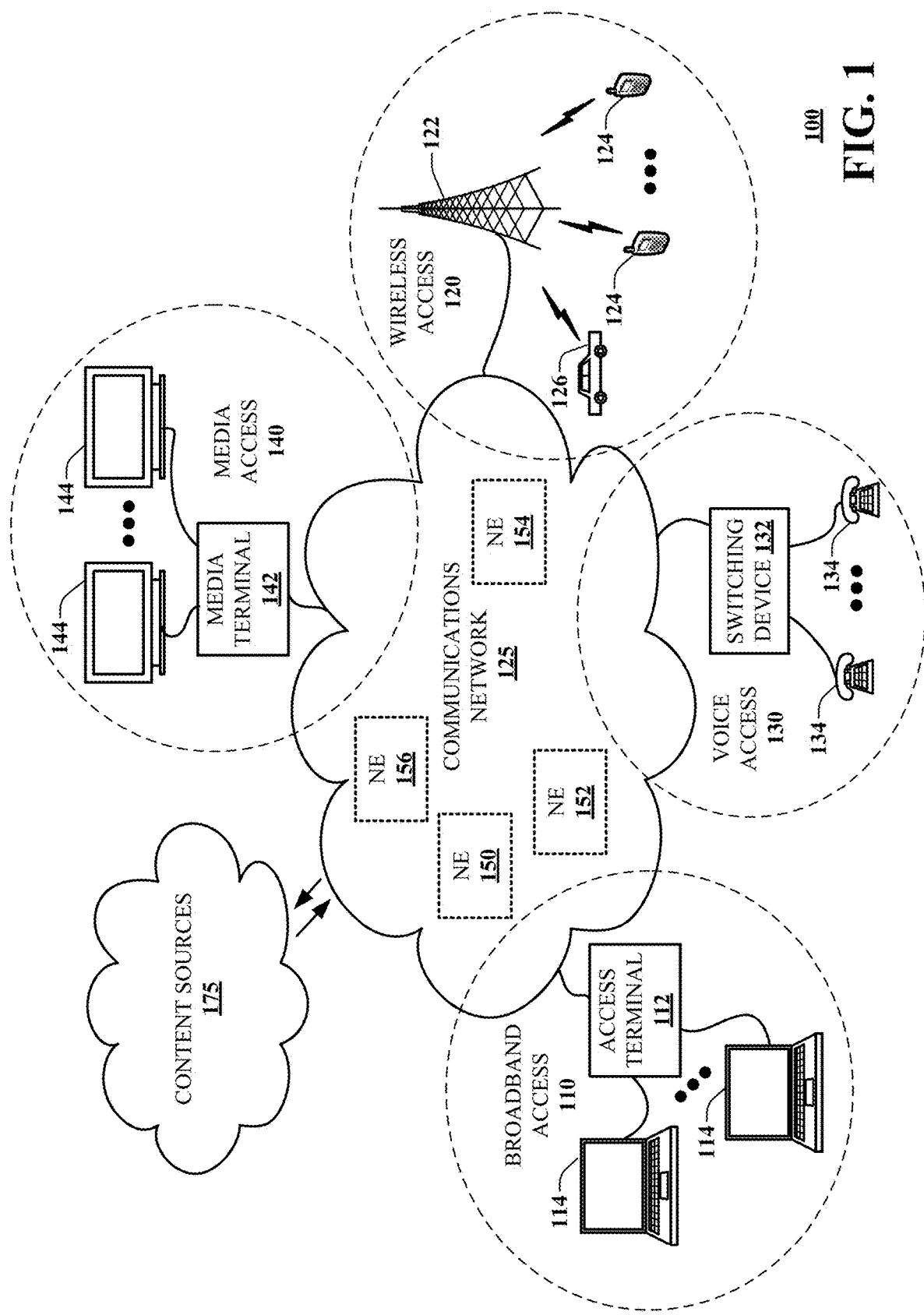
FIG. 1 is a block diagram illustrating an exemplary, non-limiting embodiment of a communications network in accordance with various aspects described herein.

Cloud-based systems for data centers, data lakes, content delivery networks, and complex artificial intelligence (AI) applications can have many sensors or applications that produce numerous (e.g., thousands of) data streams. These systems are generally monitored for issues by examining their data streams and detecting for anomalies (or outliers). Various measurements may be made relating to machines, applications, streaming of data to/from the system, and/or utilization of components, such as a central processing unit (CPU), a graphics processing unit (GPU), memory, a disk, a network, and so on, and alerts may be raised or triggered in response to detected anomalous stream behavior or detected occurrences of anomalies in measured values. Monitoring of, and alerting for, large quantities of data streams, however, can be burdensome for both human operators and machines alike. Indeed, in environments where many high-volume and high-velocity data streams are monitored, reporting anomalous behavior in (e.g., near) real-time can be challenging due to the need to process the streaming data to ensure the generation of timely alerts while also keeping anomaly detection models up to date to ensure that the alerts are meaningful.

As the number (and diversity) of data streams grows, the alerting system needs to be scalable and agnostic to the data sources that feed into it. By deploying the system on the cloud, the flexibility and scalability of the cloud allows for computational resource allocation according to demand. However, this requires an architecture that is adapted for the cloud, which permits changes to (e.g., increases in) the number of processing machines being utilized as well as periodic changes to the machines. The system needs to be flexible to allow for hot-swapping of cloud components, and yet remain computationally efficient and mindful of resource constraints.

In local or cloud-based systems, anomaly detection is typically conducted using traditional, statistical ML and deep learning (DL) models. In a typical anomaly detection system architecture, the anomaly detection functions and the maintenance of the statistical model are performed by the same machine. This conventional architecture does not take advantage of cloud-first technologies for reducing reporting latency. Furthermore, it does not scale well for high-velocity and high-volume data streams. To illustrate the problem, consider a system that monitors 1,000 data streams grouped into 10 different classes based on type, where each group has its own anomaly detection model, and the models are updated in (e.g., near) real-time based on arriving data. A typical approach may be to deploy 10 machines—i.e., one for each class of streams. Each machine may process the incoming streams based on the model it maintains, and may update the model based on these incoming streams. This typical architecture does not scale, however, since, in a case where the number of streams grows—e.g., to 100,000, and even with the same 10 classes of streams (and thus 10 anomaly detection models), each of the 10 machines would now be required to process many more streams and may not be capable of doing so. Further, changes in some of the streams may also affect the processing of other streams.

Assuming the same example of 1,000 data streams grouped into 10 classes, another approach may be to have a different machine process each given stream, where each machine maintains its own anomaly detection model. In this approach, the 10 anomaly detection models would need to be replicated on the 1,000 stream-processing machines (i.e., each model would need to be replicated approximately 100 times or so). This approach also does not scale, since, in a case where the number of streams grows e.g., to 100,000, the number of replicas of each anomaly detection model grows, and updating all of these models in a consistent way, across the different machines that are already dedicated to stream processing, becomes infeasible.

As described herein, various embodiments provide for complex multi-layer aggregation of anomalies from different data streams, and corresponding generation of real-time (or near real-time) super alerts and smart alerts. Smart alerts, in particular, may distill thousands of anomalies into a manageable number of actionable alerts based on priority, persistence, pervasiveness, perseverance, and/or recency, and thus can prevent users (or system administrators) from being overwhelmed by the sheer number of detected anomalies. This reduces the load on human operators and prevents situations where users ignore or miss critical alerts simply because they cannot distinguish them from numerous non-critical ones.

Notwithstanding, as explained above, it can be challenging to maintain numerous data streams in a cloud environment where frequent changes to the number of data streams and their volume may occur. While the flexibility of the cloud supports the deployment of new machines according to demand, cloning of virtual machines in traditional architectures may require replication of the data models involved, which complicates model maintenance and can lead to inconsistent alarms.

The subject disclosure describes, among other things, illustrative embodiments of cloud-based (or cloud-first) anomaly detection and alerting over streaming data, where anomaly detection models and data stream processing are decoupled from one another. In exemplary embodiments, a cloud-based anomaly detection system leverages cloud technologies for data transfer and processing, and employs statistical models for fast computation of super alerts and smart alerts. The overall architecture of the system supports scalability by utilizing the flexibility of the cloud environment and the ability to easily deploy new machines (or shut down unneeded ones) based on changes in demand. In various embodiments, the anomaly detection pipeline may be modular such that cloud components can be hot swapped to allow the system to adapt to resource constraints and scale as the volume of data streams and the velocity of arriving data increase. In one or more embodiments, the cloud-based system may be agnostic to data input and alert subscribers.

In exemplary embodiments, the cloud-based architecture separates data stream processing from the maintenance/updating of anomaly detection models by keeping the models in a shared database on one or more dedicated machines independent from stream-processing modules. Data streams may be processed on their own machines via a sequence of operations that may include smoothing, anomaly detection, anomaly grouping, generating of super alerts, generating of smart alerts, and so on. New virtual machines for processing streams may easily be allocated when new streams need to be processed.

Exemplary embodiments of the anomaly detection system architecture facilitate the migration of complex AI systems to the cloud, and enable effective management of resources in a cloud infrastructure and monitoring of numerous applications and systems for data lakes, content delivery networks, and data-intensive ML applications. Cloud compute infrastructure can be costly, and embodiments of the anomaly detection system architecture make the computation of alerts modular and scalable. A well-managed, scalable, and modular (cloud-first) anomaly detection system can reduce cloud-related expenses and provide real-time alerting for large volumes of data as needed for critical applications. Furthermore, generating smart alerts from noisy anomalies, as described herein, can also provide clean data to mobility data usage forecasting applications that support network planning, product management, and other domains.

One or more aspects of the subject disclosure include a system. The system can comprise a cloud computing environment configured to provide one or more dedicated virtual machines (VMs) for storing and managing anomaly detection and alerting models. Further, the system can include a device configured to control the cloud computing environment to perform instantiation and shutdown of stream-processing VMs based on a number of data streams to be processed, data stream volumes, workload of the stream-processing VMs, or a combination thereof. The stream-processing VMs may process assigned data streams by executing instances of the anomaly detection and alerting models, and may provide model outputs to the one or more dedicated VMs for maintenance or updating of the anomaly detection and alerting models. The stream-processing VMs may be distinct from the one or more dedicated VMs, thereby providing an anomaly detection and alerting architecture in which stream processing is decoupled from model maintenance and updating.

One or more aspects of the subject disclosure include a non-transitory machine-readable medium, comprising executable instructions that, when executed by a processing system including a processor, facilitate performance of operations. The operations may comprise detecting data streams to be processed. Further, the operations may comprise, based on the detecting, causing a cloud resource environment to provide a group of cloud-based resources to process the data streams. The group of cloud-based resources may comprise a plurality of stream-processing virtual machines (VMs) for processing the data streams. Further, the group of cloud-based resources may comprise one or more dedicated VMs for storing and managing anomaly detection and alerting models. The plurality of stream-processing VMs may be separate from the one or more dedicated VMs. The operations may further comprise, based on monitoring of one or more conditions, controlling the cloud resource environment to perform shutdown of select stream-processing VMs of the plurality of stream-processing VMs or to adjust data stream processing assignments for the plurality of stream-processing VMs. The plurality of stream-processing VMs may process assigned data streams by executing instances of the anomaly detection and alerting models, and may provide model outputs to the one or more dedicated VMs for maintenance of the anomaly detection and alerting models.

One or more aspects of the subject disclosure include a method. The method can comprise detecting data streams by a processing system including a processor, wherein the processing system is associated with an anomaly detection and alerting system in which stream processing and model maintenance is decoupled from one another, and wherein one or more dedicated virtual machines (VMs) store and maintain anomaly detection and alerting models. Further, the method can include, based on the detecting, causing, by the processing system, a plurality of stream-processing VMs to be instantiated for processing the data streams. Further, the method can include managing, by the processing system, data stream assignments for the plurality of stream-processing VMs based on monitoring of one or more conditions, wherein the plurality of stream-processing VMs process assigned data streams by executing instances of the anomaly detection and alerting models, and provide model outputs to the one or more dedicated VMs for updating of the anomaly detection and alerting models.

Other embodiments are described in the subject disclosure.

Referring now to FIG. 1, a block diagram is shown illustrating an example, non-limiting embodiment of a system 100 in accordance with various aspects described herein. For example, system 100 can facilitate, in whole or in part, cloud-based (or cloud-first) anomaly detection and alerting over streaming data, where anomaly detection models and data stream processing are decoupled from one another. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communications network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
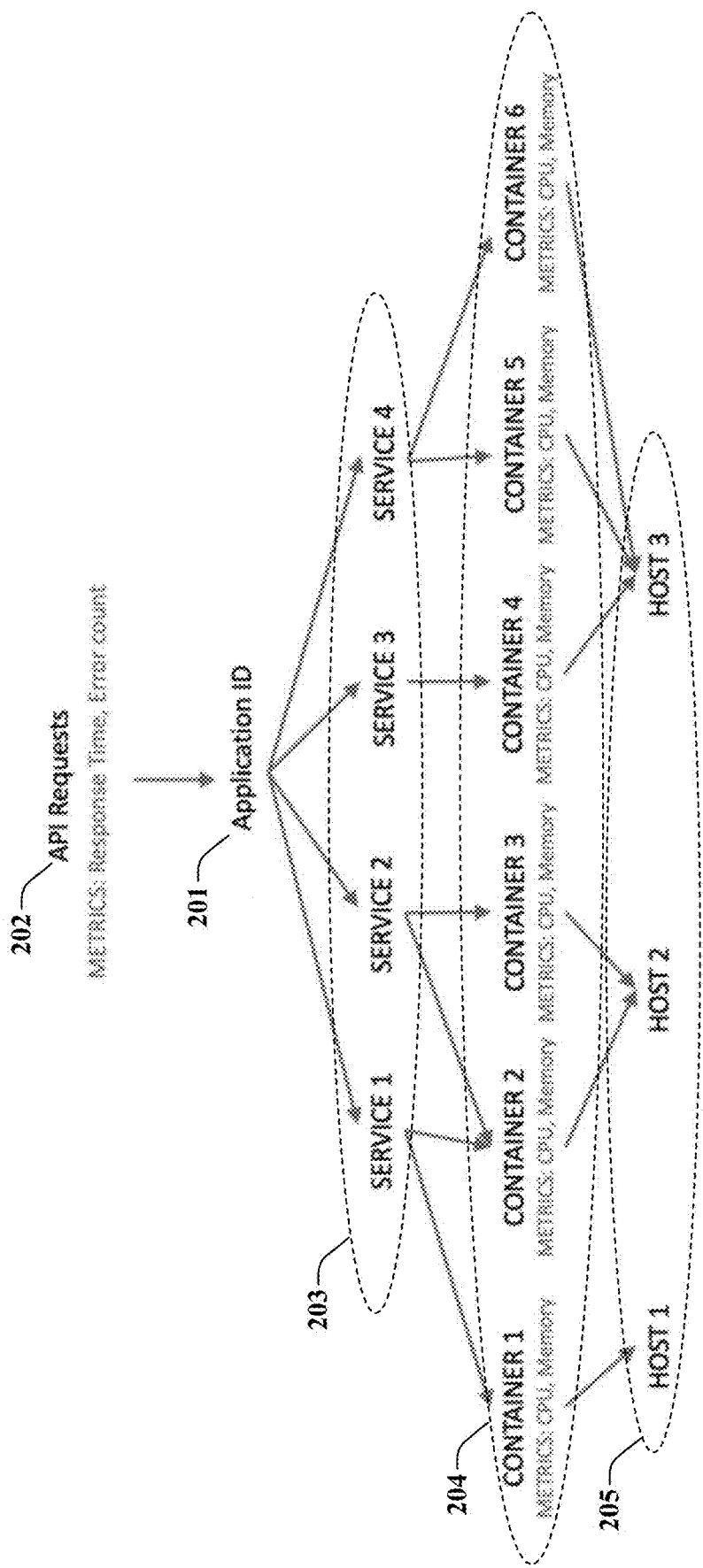
FIG. 2A is a block diagram illustrating an example, non-limiting embodiment of an operational hierarchy for a cloud-based system that generates data streams, functioning within the communications network of FIG. 1 in accordance with various aspects described herein.

A data stream is a continuous set of temporal measurements associated with an entity described by a set of features. Modern anomaly detection scenarios have multiple streams, multiple objects, multiple components, and multiple metrics. Extant anomaly detection methods treat a single stream, single object, single component, and single metric, and issue too many alerts, even if just those occurring by statistical chance. Operations teams can be overwhelmed and ignore the alerts, missing critical events that could have catastrophic consequences. FIG. 2A is a block diagram illustrating an example, non-limiting embodiment of an operational hierarchy for a cloud-based system that generates data streams, functioning within the communications network 100 of FIG. 1 in accordance with various aspects described herein. The present technology can be applied to any hierarchical system that generates a plurality of data streams at one or more levels of the hierarchy. In the embodiment illustrated in FIG. 2A, the exemplary system comprises a cloud-based application 201 at the top of the hierarchy that is installed in the cloud and accessible via Internet API requests 202. In this exemplary embodiment, cloud-based application 201 is supported by one or more services 203. Services 203 provide features needed by cloud-based application 201. The performance of services is monitored via metrics, such as "process CPU usage," "memory usage," and "response time."

In turn, each service 203 is supported by one or more containers 204. Containers 204 are software packages that contain everything needed to run software. Each container includes an executable program as well as system tools, libraries, and settings. By compiling all the components and keeping them in one place, containers 204 can transfer large packages of software with ease, ensuring that no key data is lost in the process. The software in containers 204 are executed on one or more hosts 205. Hosts 205 can be, for example, network elements 150, 152, 154, and/or 156, virtual machines, or physical servers (not illustrated).

A data stream is characterized by (1) dimensions that are descriptive features and typically categorical, and (2) a temporal measurement associated with each combination of the dimensions such that each combination of dimensions gives rise to a distinct stream of measurements. Data streams are always temporal, and data can arrive at any time, but typically, streams are aggregated to statistical signatures that align at desired frequencies, such as t1, t2, t3, which can be milliseconds, seconds, minutes, or any other time interval. For a given metric, there can be as many streams as there are combinations of dimensions. Each metric generates a data stream for any given path in the hierarchy in FIG. 2A. For example, there are three metric data streams associated with each combined key consisting of (application, service, container, host):

CPU (application, service, container, host)=cpu_t1, cpu_t2, cpu_t3, . . .
Memory (application, service, container, host)=m_t1, m_t2, m_t3, . . .
ResponseTime (application, service, container, host)= r_t1, r_t2, r_t3, . . .

In a particular example, in the dimension hierarchy illustrated by the cloud-based application 201 shown in FIG. 2A, the dimensions are:

Application ID, e.g., 23901,
Names of the services they offer, e.g., "Loyalty Offers,"
ID of a container that supports the service, e.g., zlp11111-loyaltyoffers-1-4-bau-sldc-68598fc7f5-gd66q,
ID of a host that the container runs on, e.g., Host1, and
Name of the metric being measured, e.g., java.lang: HeapMemoryUsage.used.

Each combination of categorical features may have a stream of time-dependent measurements associated therewith. For example, consider that the specific combination of dimensions noted above generates a stream of (5-minute aggregate) measurements associated with it, e.g.:

2021-08-29 06:30:0011207.4
2021-08-29 06:35:0011234.2
2021-08-29 06:40:0011199.1 where the average memory usage was 1207.4 units in the five-minute interval from 2021-08-29 06:30:00 to 2021-08-29 06:35:00, 1234.2 in the subsequent five-minute interval, etc. Other data streams may include temporal measurements on key performance indicators (KPIs) like Web:apiErrorCount, Web:apiResponseTime, java.lang:ProcessCpuLoad, and the like. Given thousands of applications in an enterprise with hundreds of services and dozens of containers for each service, each with tens of metric measurement data streams, any anomaly detection method, however accurate, will generate a multitude of alarms every hour, due to randomness of the metrics, resulting in a plethora of alerts that may not require any actions to correct.

Figure 2B:
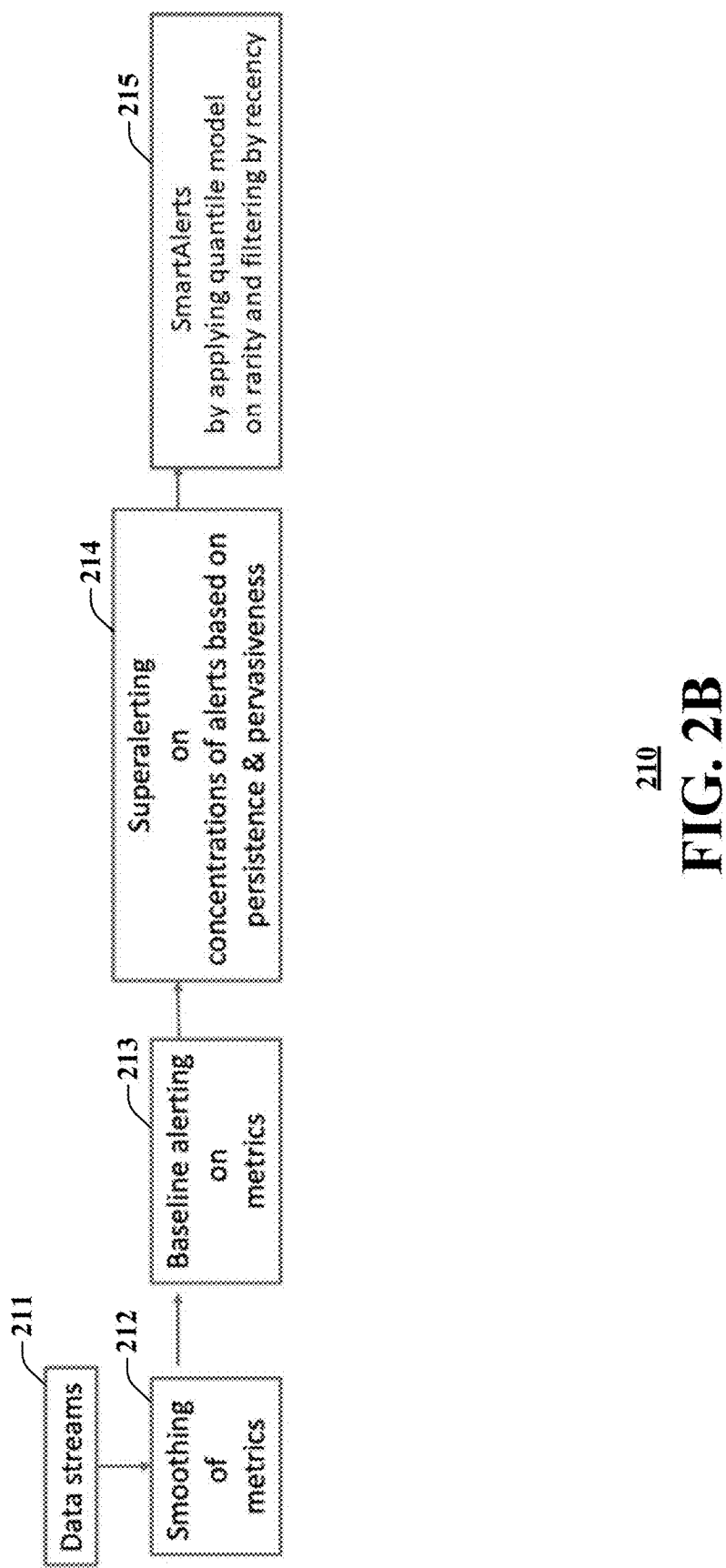
FIG. 2B depicts an illustrative embodiment of a method of generating smart alerts in accordance with various aspects described herein.

FIG. 2B depicts an illustrative embodiment of a method of generating smart alerts in accordance with various aspects described herein. A system is designed to raise alerts around a set of alerts that occur more frequently than predicted by statistical chance, rather than upon the occurrence of single outliers. An architecture for such a system is set forth in more detail in co-pending U.S. patent application Ser. No. 17/699,969, entitled "ARCHITECTURE FOR SCALABLE SMART ALERTING ACROSS A MULTITUDE OF DATA STREAMS," filed on Mar. 21, 2022, which is incorporated by reference herein in its entirety. Furthermore, in addition to syntactic constraints derived from statistical rules, alerts should be based on semantic considerations that help answer the question "what can be done to fix this problem," thus making the alerts actionable. Semantic considerations consider the nature of the data streams (authentication application versus customer-care application), hierarchies and relationships between the streams, nature of the set of alerts (persistent in time, pervasive across multiple streams) to generate super alerts that could be sent to automated systems, and further identify an extremely small number of smart alerts based on recency, rarity and other semantic properties for potential human screening. Recency ensures that smart alerts are timely, and rarity, identified using the quantile model, ensures that the smart alerts are significant.

As shown in FIG. 2B, a method 210 begins with step 211, where a system collects a plurality of data streams. In step 212, the system smooths the input data streams. Such smoothing, for example, may consist of time weighted averaging over a period. Then in step 213, the system develops baseline alerts from the smoothed streams. A baseline alert is an alert generated for an individual data stream at the most granular time unit of measurement. Such baseline alerts can be binary (0, 1), scores (e.g., p-values), or normalized deviations (2-$\sigma$). Baseline alerts are explained in more detail below in connection with FIG. 2C.

Next in step 214, the system discovers a concentration of alerts to generate super alerts based on persistence and pervasiveness of the baseline alerts, as explained in more detail below in connection with FIG. 2D. Finally in step 215, the system selects only significant super alerts based on priority, persistence of the anomalies, and pervasiveness over many streams or dimensions to generate smart alerts, as explained in more detail below in connection with FIG. 2E. The system also applies a quantile model of rarity and bases the selection by recency because recent events are more actionable than outdated events. This process is explained in more detail below in connection with FIG. 2F.

Figures 2C, 2D:
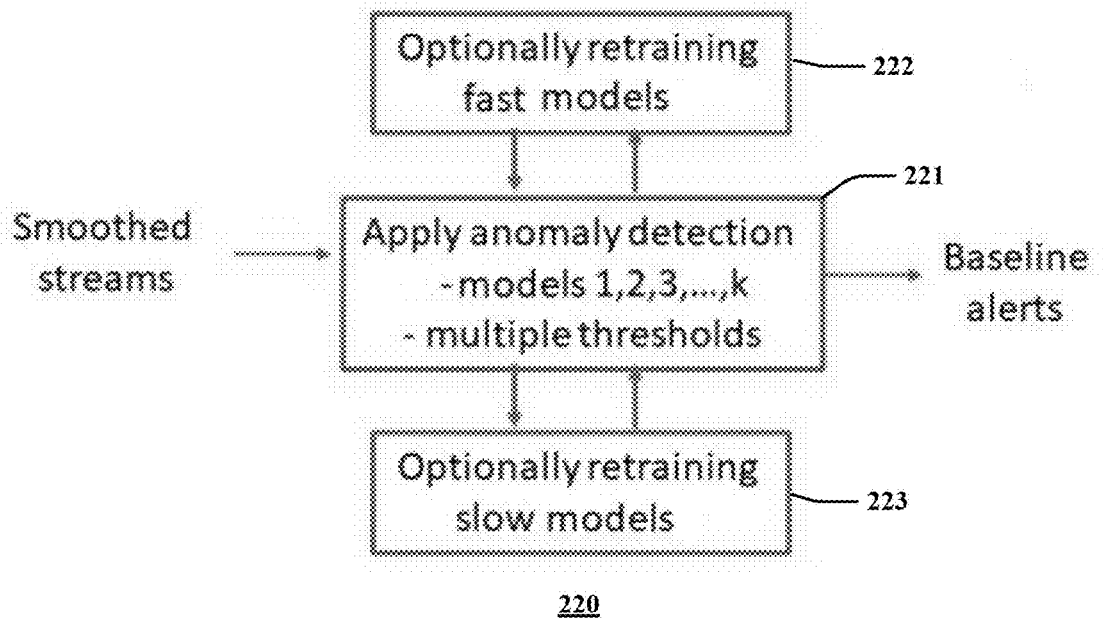
FIG. 2C depicts an illustrative embodiment of a method of generating baseline alerts in accordance with various aspects described herein.
FIG. 2D depicts an illustrative embodiment of a method of generating super alerts in accordance with various aspects described herein.

FIG. 2C depicts an illustrative embodiment of a method 220 of generating baseline alerts in accordance with various aspects described herein. As shown in FIG. 2C, in step 221, the system processes smoothed data streams by applying one or more anomaly detection models 1-$k$, consisting of multiple thresholds. The result is a stream of detected anomalies. In the process, new data are streamed through the baseline alerting module. The system can use that data for retraining the models. In step 222, the system retrains just the models of fast methods, i.e., those models that do not require much data to be trained. In step 223, the system retrains the models whose training is slow. Either step is optional, and the system may retrain all the models for creating baseline alerts.

Figure 2E:
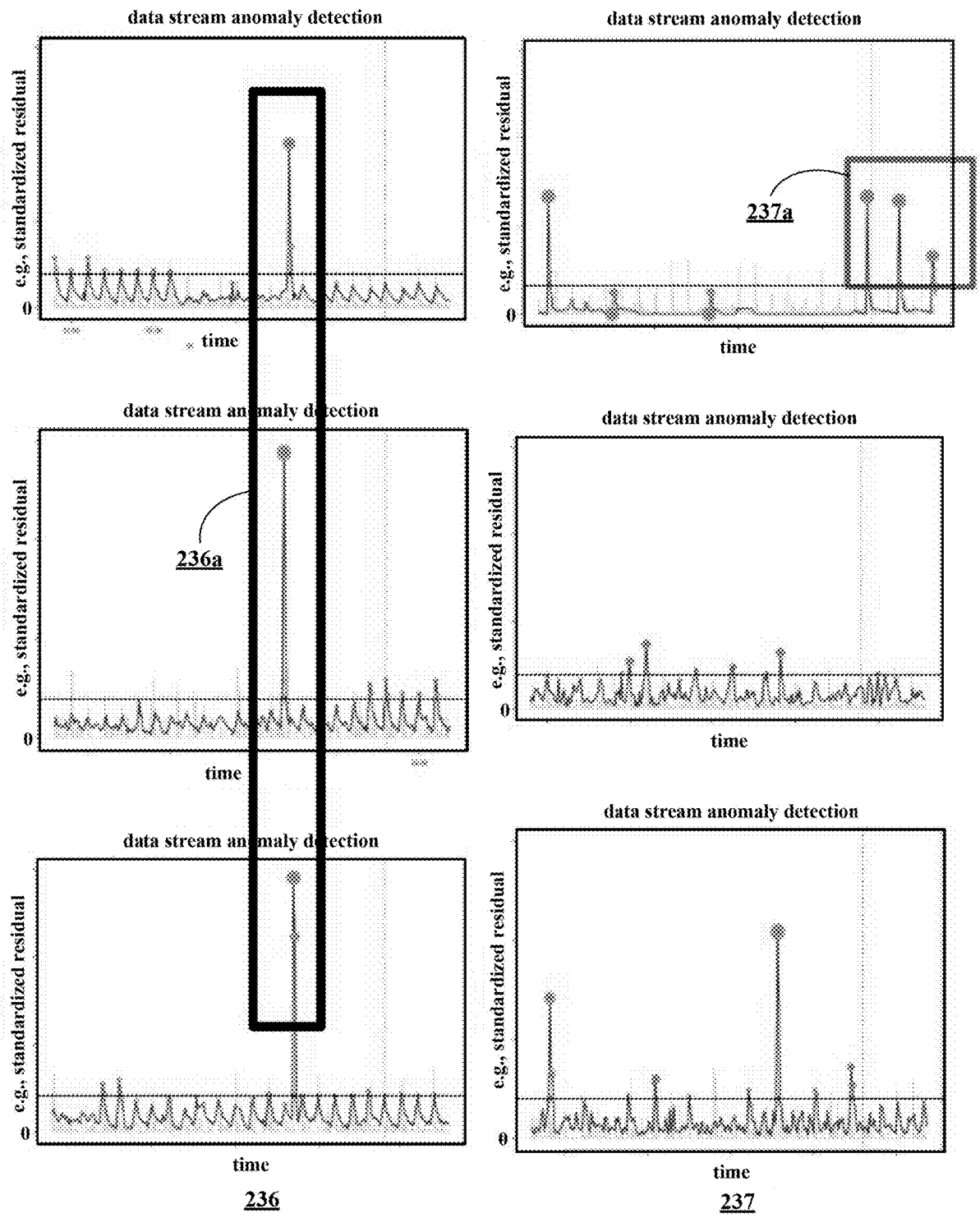
FIG. 2E depicts an illustrative embodiment of rolling up baseline alerts for generating super alerts in accordance with various aspects described herein.

FIG. 2D depicts an illustrative embodiment of a method 230 of generating super alerts in accordance with various aspects described herein. There are two stages to generating super alerts: (1) ingesting anomalies from individual streams and (2) finding important anomalies and hotspots of anomalies in time, and across multiple streams (different dimensions, combinations of different dimensions). As shown in FIG. 2D, in step 231, the system processes baseline alerts by "rolling up" along a path of the hierarchy, to discover significant groups of alerts. Such "rolling up" is illustrated in FIG. 2E below. Next in step 232, like in the method 220, different anomaly detection models are used having different thresholds. Then in step 233, voting is applied—a set of alerts is considered a super alert only if enough models agree that the set of alerts should be considered a super alert. In other words, only if the number of models that deem this set as a super alert exceeds a predefined threshold. As in the case of baseline alerts, retraining the models of the fast or slow methods is optional, at each of steps 234 and 235.

FIG. 2E depicts an illustrative embodiment of rolling up baseline alerts for generating super alerts in accordance with various aspects described herein. Super alerting runs anomaly detection on select aggregations, called rollups, which are either data-driven ("all containers that support a service") or identified by additional topological information ("aggregated by containers that reside on nearest neighbors in a topological neighborhood of HOST1"). Super alerts represent anomalies that persist in time or affect multiple streams. Identifying a statistically significant concentration of anomalies, or hotspots, across multiple streams is the precursor to generating smart alerts that are multi-object, multi-component, multi-metric, i.e., affect many entities, and are potentially persistent. As shown in FIG. 2E, two examples of "rolling up" the hierarchy are illustrated.

In each of the graphs shown, the horizontal axis represents time, and the vertical axis represents an observed metric (e.g., in a standardized form). The horizontal dotted line (within each of the graphs) represents a threshold, which may be learned from historical data (e.g., self-learned by a corresponding anomaly detection/alerting model based on prior repeat alarms, user input, and/or the like). Values above the threshold may be considered dense or significant, and thus a concentration of "spiky" values over time or across different streams may be significant. In various embodiments, comparisons of the various graphs may provide insights on anomalies, as described herein.

In the first example, three graphs 236 depicted on the left side of FIG. 2E show baseline alerts that were detected at three distinct levels of the hierarchical structure generating data streams. Such pervasiveness meets the criteria for generating a super alert. For instance, each graph in 236 may correspond to a different data stream (e.g., provided by a respective sensor or application), where reference number 236a identifies anomalies across the different streams, which may be indicative of a multi-object event that is impacting a number of streams.

In the second example, three graphs 237 illustrated on the right side of FIG. 2E show three consecutive baseline alerts (237a) at a particular level of the hierarchy. Such temporal persistence of baseline alerts meets the criteria for generating a super alert. However, super alerts are insufficient for filtering enough alerts to a manageable level, so further correlations are needed.

Figure 2F:
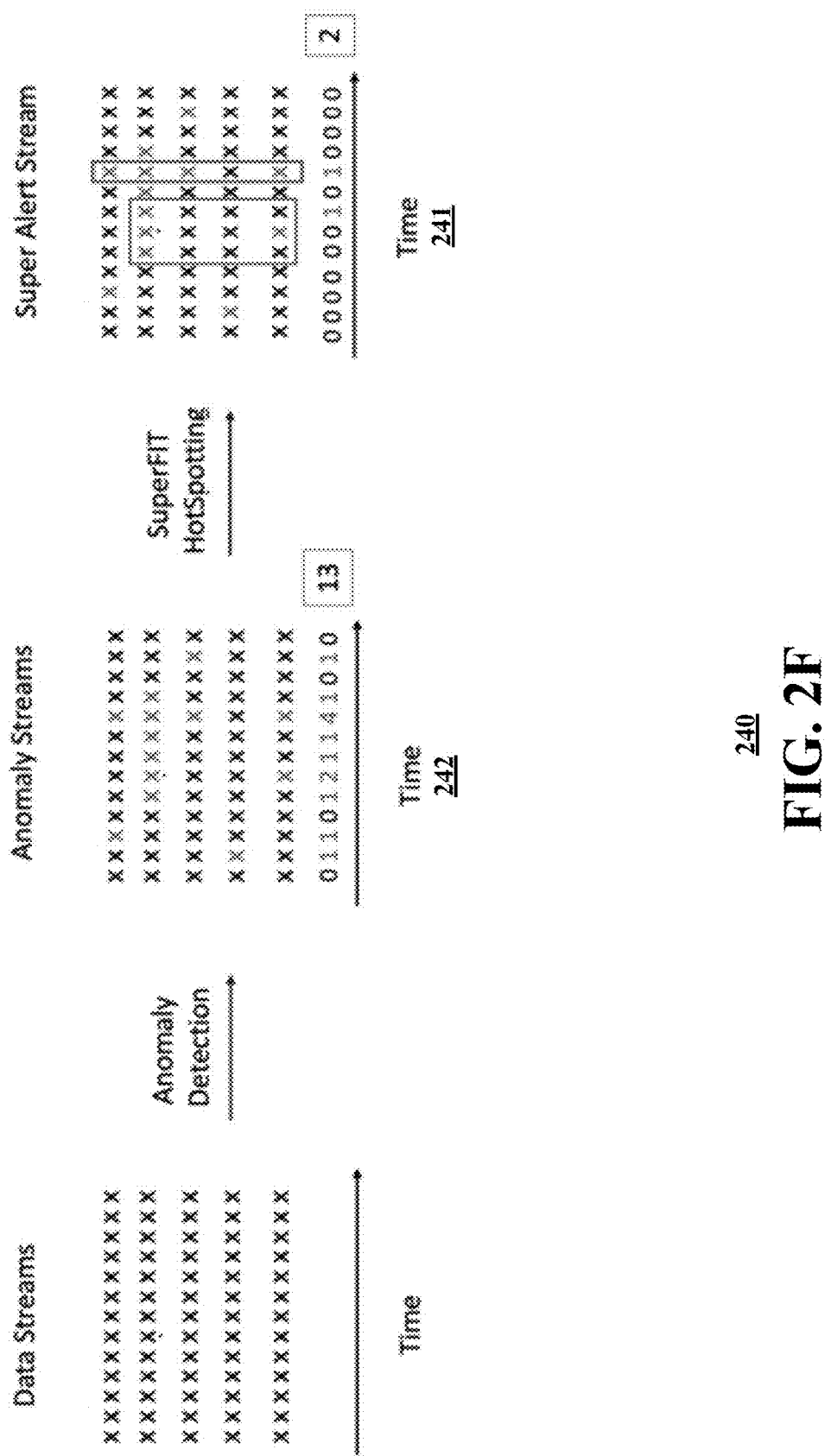
FIG. 2F depicts an exemplary embodiment of using a dynamic quantile model to generate smart alerts in accordance with various aspects described herein.

FIG. 2F depicts an exemplary embodiment of using a dynamic quantile model to generate smart alerts in accordance with various aspects described herein. As mentioned above, super alerting runs anomaly detection on select aggregations, called rollups, that are either data-driven ("all containers that support a service") or identified by additional topological information ("aggregated by containers that reside on nearest neighbors in a topological neighborhood of HOST1"). The system ranks super alerts based on their persistence, pervasiveness, priority, and recency. The super alerts and their deviation of density from the expected super model are put through a dynamic quantile model based on historical data and are further filtered based on recency to generate smart alerts. In an example 240 shown in FIG. 2F, anomaly detection on such aggregations expects a certain level of noise (anomalies due to pure chance) and identifies only concentrations that are over and above the normal level of noise. A rollup shown in chart 242 illustrates that 0, 1 anomalies are acceptable since they happen quite often. But as chart 241 illustrates, three super alerts in a row on the same stream and anomalies on at least two streams leads to the generation of smart alert #1. Similarly, four simultaneous anomalies across multiple super alert streams are uncommon, which leads to the generation of smart alert #2. Smart alerting finds such regions of high density of anomalies in a continuous data-driven manner. Note that each smart alert encapsulates many connected anomalies, but results in a single actionable notification. As shown in chart 242, any standard anomaly detection method on individual streams would have resulted in 13 anomalies in 9 out of the 13-time instances, whereas smart alerting generates only two alerts, as shown by the rectangles in chart 241.

Thus, a smart alert may be a subset of super alerts. Where a super alert may be determined algorithmically, filtering may be applied—e.g., based on recency criteria, concentration criteria, and so on—to focus in on events of interest. Filtering may be user-defined and/or self-learned by the system (using one or more ML models). In various embodiments, only groups of anomalies that are dense and significant (e.g., based on priority, recency, pervasiveness, etc.) may yield a super alert, and only a dense group of super alerts in a brief period (e.g., within a threshold period of time) may trigger a smart alert. In certain embodiments, application type may also be user-defined for anomaly detection—e.g., where anomalies associated with a particular application are to be alerted to the user. In any case, filtering or alert concentration provided by the smart alerting algorithm may help determine whether issues are occurring on the same virtual machine, on different virtual machines running on the same physical machine, or across different virtual machines running on different physical machines.

Figure 2G:
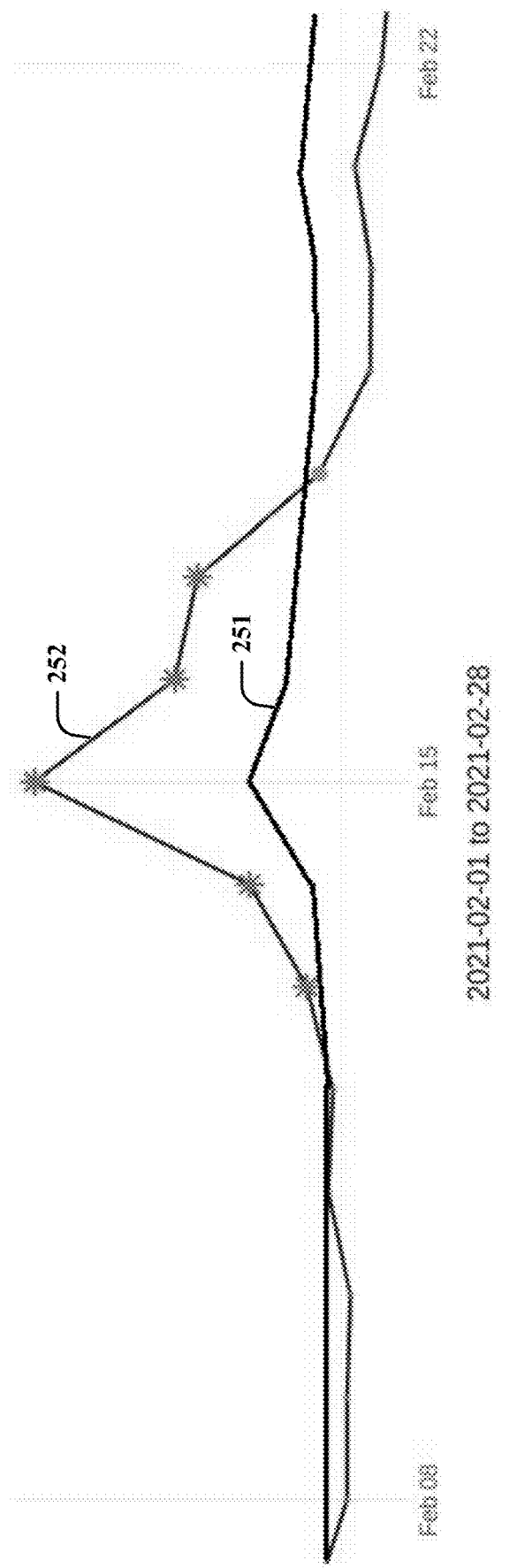
FIG. 2G is a graph that depicts an illustrative embodiment of performance of a dynamic quantile model in accordance with various aspects described herein.

FIG. 2G is a graph 250 that depicts an illustrative embodiment of performance of a dynamic quantile model in accordance with various aspects described herein. A dynamic quantile model entails computing quantiles in a continuously evolving manner based on a sliding window of historical data, e.g., the data from the most recent 24 hours. Quantiles divide the sorted data into equal parts. For example, percentiles are specific instances of quantiles that divide the sorted data into 100ths, where any given percentile, e.g., $84^{th}$ percentile, would be the value that is greater than or equal to 84% of the data when ranked in ascending order. By using a sliding window that captures the most recent data, we ensure that the quantile model is dynamic and reflects the most current state of the data distribution. The more data that is available, the more accurate and fine-grained the quantiles become. If there are only 10 data points, computing percentiles is meaningless, and the best that can be done perhaps, is a median that divides the data into two sorted halves. A rough rule of thumb is that the number of quantiles is less than the number of samples divided by ten, i.e., to ensure that there are at least ten data points for every quantile. If there are millions of data points, quantiles can be computed at greater granularity, and with a greater confidence. As shown in FIG. 2G, the dynamic quantile model computes an extreme quantile threshold 251, which may, for example, be a 95th percentile of the deviation of density of a super alert hotspot from the expected density of the hotspot, as dictated by the super model that generates the super alerts. From among the super alerts 252 that exceed this threshold (illustrated by asterisks), the system further imposes conditions of recency, and identifies only those that occurred recently enough to warrant action. Once the system tags a super alert, the super alert will remain tagged unless additional late-arriving data causes the state to alter. Because of this, running a filter for super alerts could net problems that potentially occurred a few hours prior and could have either been remedied or ignored because the problem was not worth addressing. To minimize this flapping condition, the system ignores data arriving more than an hour late. The data is collected and stored for completeness, but is not used by the alarming pipeline. In either case, stale super alerts that have already been flagged should not generate an alert. Note that this is a configurable parameter. The first asterisk ceases to be a smart alert once it becomes stale, e.g., after thirty minutes.

Figure 2H:
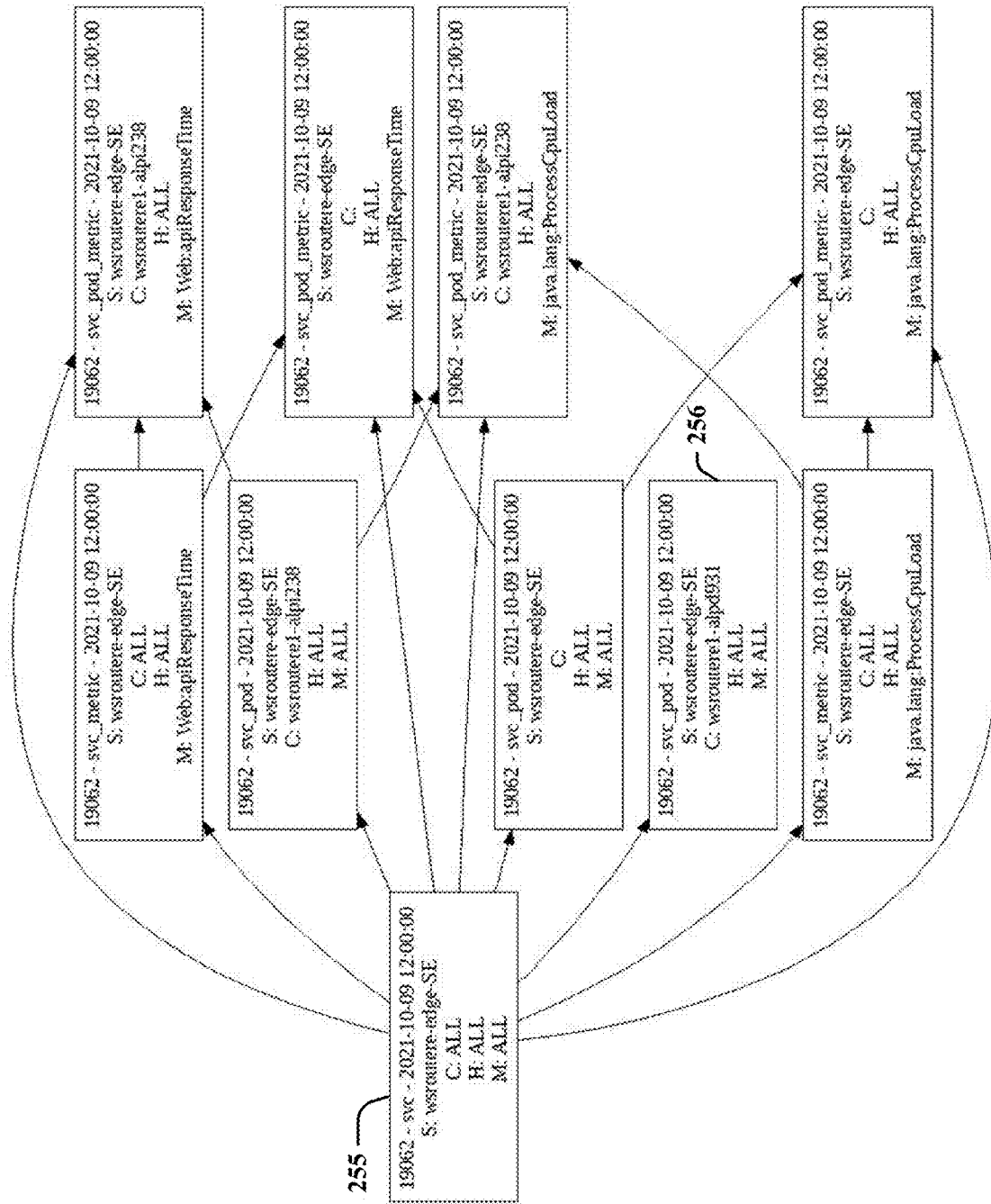
FIG. 2H is a diagram that illustrates an example of a smart alert and the individual lower-level alerts that contributed to the smart alert.

Furthermore, the system identifies all the underlying super alerts that support this smart alert to generate an explanatory description that could make the smart alert actionable. FIG. 2H is a diagram that illustrates an example of a smart alert and the individual lower-level alerts that contributed to the smart alert. The nodes on the right represent lowest-level super alerts, e.g., alerts generated for a specific metric. The alerts in the middle column are higher-level super alerts, either at a compute component (svc_pod) or rolled-up metric level (svc_metric) level. The alert on the left is a smart alert 255 that the system generates and pushes to downstream systems. Sometimes an alert condition is not detected at the lowest level, because the individual signals are not strong enough, but when rolled up there is enough signal to warrant generating an alert (e.g., the svc_pod alert 256 in the middle column, second from the bottom that has to edge to the right). The labels in these nodes include the application ID, the timestamp of the alert, and the individual assets represented. A value of ALL indicates that the alert is a rollup of all the underlying assets.

Previous alerting systems focused on individual alerts and reducing the number of false positives. Some systems reduced the number of alerts by suppressing alerts that were close together in time. While this approach might be effective for monitoring a limited number of streams, the approach fails when monitoring a massive number of streams which would generate a large number of alerts by sheer statistical chance, at random points in time, in random series.

The disclosed system focuses on significant hotspots of anomalies—an "unusual" density of alerts that are concentrated in time and/or affect a multiple set of streams. Unusual is defined with reference to recent history so that density of anomalies has to be significant compared to the constantly evolving historical norm, not based on some fixed threshold. The system identifies unusually long or short runs of anomalies, as well as unusual co-occurrence of anomalies across multiple streams.

Furthermore, by imposing additional constraints (learned from historical data) on recency and extremeness of the density, the system ensures that the alerts are relevant and actionable. This is a unique aspect to the disclosed alerting system and provides operators with alerts that are significant since they affect multiple objects (streams) and are not one-off and not remediated by the AI-based self-correcting solutions baked into the system. Furthermore, descriptions of the objects aid the system to locate the alert in the domain space (e.g., cloud components) and the hierarchy of the alerts in the hotspot could potentially point to the propagation of the anomalies.

While for purposes of simplicity of explanation, the respective processes are shown and described as a series of blocks in FIGS. 2B-2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2I:
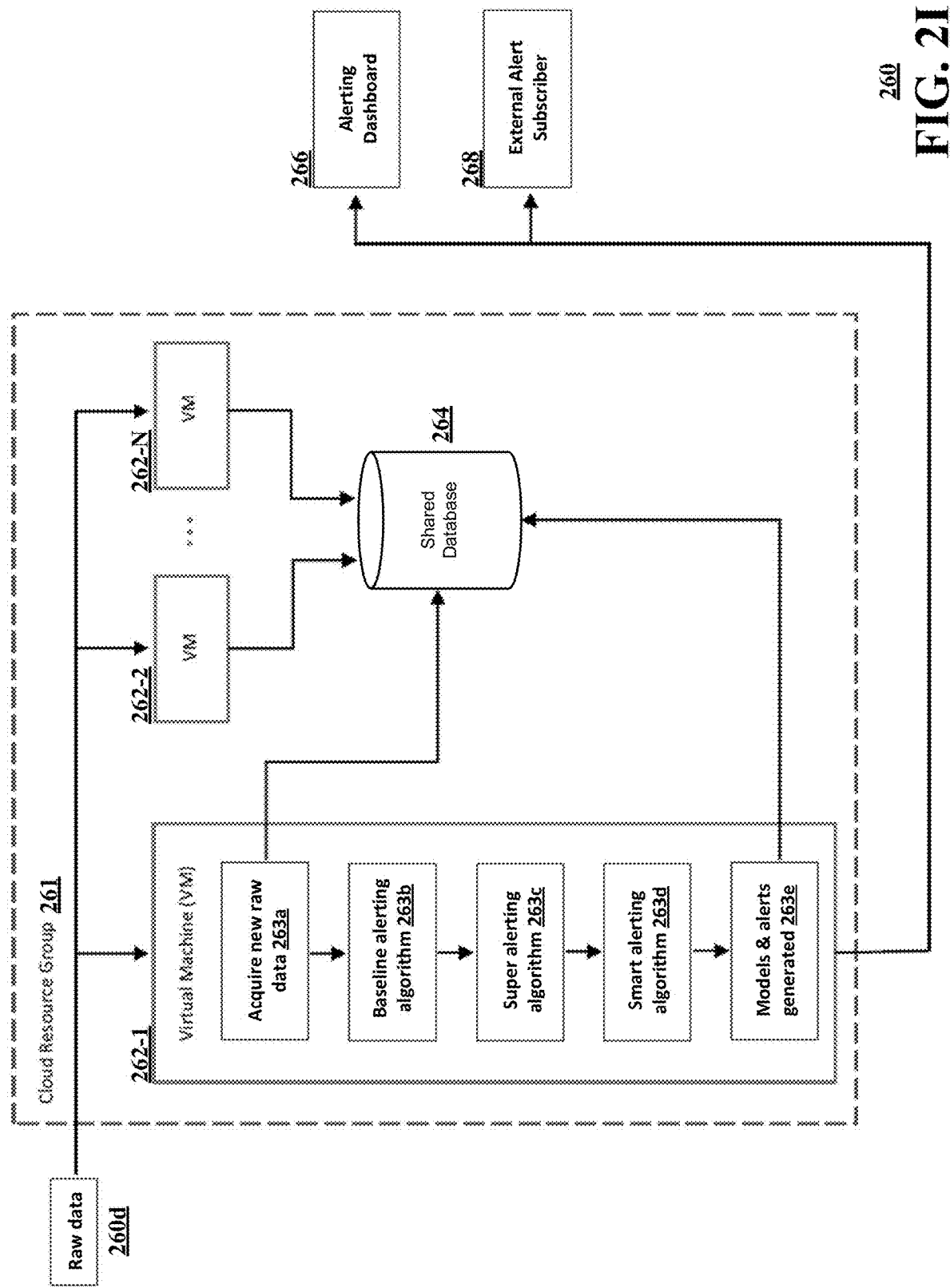
FIG. 2I is a block diagram illustrating an example, non-limiting embodiment of a system functioning within, or overlaid upon, the communications network of FIG. 1 and/or functioning in relation to one or more of the embodiments of FIGS. 2A-2H, in accordance with various aspects described herein.

Exemplary embodiments may employ cloud-optimized technologies to achieve scalability and fast deployment of anomaly detection and alerting. FIG. 2I is a block diagram illustrating an example, non-limiting embodiment of a system 260 functioning within, or overlaid upon, the communications network 100 of FIG. 1 and/or functioning in relation to one or more of the embodiments of FIGS. 2A-2H, in accordance with various aspects described herein.

As shown in FIG. 2I, the system 260 may include a cloud resource group (or cloud computing environment) 261. In various embodiments, the cloud resource group 261 may provide computing resources, such as servers (e.g., physical servers and/or virtual servers), applications, networking capabilities, data storage, development tools, and so on for on-demand access via one or more networks (e.g., the Internet). In one or more embodiments, the cloud resource group 261 may provide some or all of these resources on-premises. In some embodiments, the cloud resource group 261 may deliver hosted services or offerings, such as Infrastructure-as-a-Service (IaaS), Platform-as-a-Service (PaaS), and/or Software-as-a-Service (SaaS). The cloud resource group 261 may be implemented as a public cloud, a private cloud, or a hybrid cloud.

As depicted in FIG. 2I, the cloud resource group 261 may include a shared database 264 and virtual machines (VMs) 262-1 through 262-N (N≥1) (hereinafter referred to collectively as "VMs 262" and individually as "VM 262").

In various embodiments, each of the VMs 262 may be a virtual "guest" machine that runs on a physical "host" machine. For instance, in one or more embodiments, one or more of the VMs 262 may run a distribution of Linux as the guest operating system on a host server running the same or a different operating system. In some embodiments, one or more of the VMs 262 may be a process virtual machine that allows a process to run as an application on a host machine and that masks the underlying hardware or operating system. In certain embodiments, one or more of the VMs 262 may be a system virtual machine that is (e.g., fully) virtualized and support sharing of a host machine's physical resources among multiple VMs.

In exemplary embodiments, a VM 262 may be instantiated to process one or more streams of data 260d. In various embodiments, data streams may be allocated to VMs 262 for processing, depending on data volume. For example, in a case where a data stream has a high volume of data (e.g., higher than a threshold volume), a VM 262 may be dedicated for processing that stream. For data streams with lower volumes of data (e.g., less than or equal to the threshold volume), a single VM 262 may be assigned to process all of these streams. When the number of streams increases (or the volume of data per stream increases), new stream-processing machines can be allocated in the cloud 261, such as by cloning an existing stream-processing machine and assigning the new machine to the newly-incoming streams.

In exemplary embodiments, the VMs 262 may be configured to run containers. A container may (e.g., similar to that described above with respect to FIG. 2A) include an application and its required dependencies—e.g., binaries, libraries, and other dependencies. Deploying a container on a VM 262 enables portability of the container while providing performance benefits associated with containers. In various embodiments, the anomaly detection and alerting system may be designed (or built) and packaged in one or more containers, which can ensure that the system is consistent when deployed. Here, a container may include the required components (i.e., models/algorithms) for generating smart alerts, including components for stream smoothing, anomaly detection, anomaly grouping, computation of super alerts, computation of smart alerts, and/or model updating. As there may be different streams of data being input into the overall system, the various VMs 262 may process different data feeds (whether a single stream or a collection of streams) using generally the same container components. In various embodiments, the models/algorithms may be similar to, may be the same as, or may otherwise correspond to the various models/algorithms described above with respect to one or more of FIGS. 2A-2H. In certain embodiments, different models/algorithms may be employed for different types of data streams.

In one or more embodiments, the system 260 may employ toolset(s) to programmatically create new VMs in the cloud, unpackage the container(s), and trigger anomaly alerting. When deployed to process one or more data streams, a VM 262 may run the relevant model(s) continuously, periodically (e.g., once every few seconds, once every few minutes, etc.), or based on user command and/or other conditions. Execution of the models at appropriate times may control (or reduce) lag time between events and identification of issues, and thus enable timeliness of alerts.

As shown in FIG. 2I, (e.g., each of) the VMs 262 may output alerts to an alerting dashboard 266 and subscribers 268. An example dashboard (or interactive visualization and exploration system) is set forth in more detail in co-pending U.S. patent application Ser. No. 17/717,494, entitled "INTERACTIVE VISUALIZATION AND EXPLORATION OF MULTI-LAYER ALERTS FOR EFFECTIVE ANOMALY MANAGEMENT," filed on Apr. 11, 2022, which is incorporated by reference herein in its entirety.

As depicted in FIG. 2I, (e.g., each of) the VMs 262 may feed outputs to the shared database 264. In various embodiments, the shared database 264 may be implemented on one or more dedicated VMs separate from the stream-processing VMs 262. The one or more dedicated VMs that implement the shared database 264 may provide anomaly detection service(s) based on the model(s) that they maintain, and may receive alerts/model-update information (e.g., from 263*a* and/or 263*e*) and perform updating of the model(s) accordingly. In one or more embodiments, the shared database 264 may be a distributed database deployed on multiple VMs, which increases the scalability of the service. It is to be appreciated and understood that the number of dedicated VMs used for model maintenance may or may not be equal to the number of stream-processing VMs 262.

In exemplary embodiments, various models may be stored and maintained (e.g., updated and/or trained) in the shared database 264. These models may include the baseline alerting algorithm 263*b*, the super alerting algorithm 263*c*, the smart alerting algorithm 263*d*, some or all of which may be package in the aforementioned container(s) to be deployed on the various VMs 262. This allows any newly-deployed VM 262 and associated container to always have the latest anomaly detection/alerting models, and eliminates the confusion that may otherwise arise if multiple copies of models were instead maintained in each machine. The modularity of the overall system 260 thus decouples stream processing from alert data-based model training. In various embodiments, the models/algorithms may be similar to, may be the same as, or may otherwise correspond to the various models/algorithms described above with respect to one or more of FIGS. 2A-2H. In certain embodiments, different models/algorithms may be employed for different types of data streams.

In various embodiments, the storage solution for the shared database 264 may have a high throughput (e.g., higher than a threshold throughput), which can provide improved (or optimal) performance, particularly in cases where the anomaly detection/alerting system has a high bandwidth of 1 and 0 outputs—e.g., 1 for anomaly detected, 0 for no anomaly detected. In certain embodiments, one or more (e.g., each) of the VMs 262 may additionally, or alternatively, be configured to train one or more the models and/or create (or generate) new model(s).

Figure 2J:
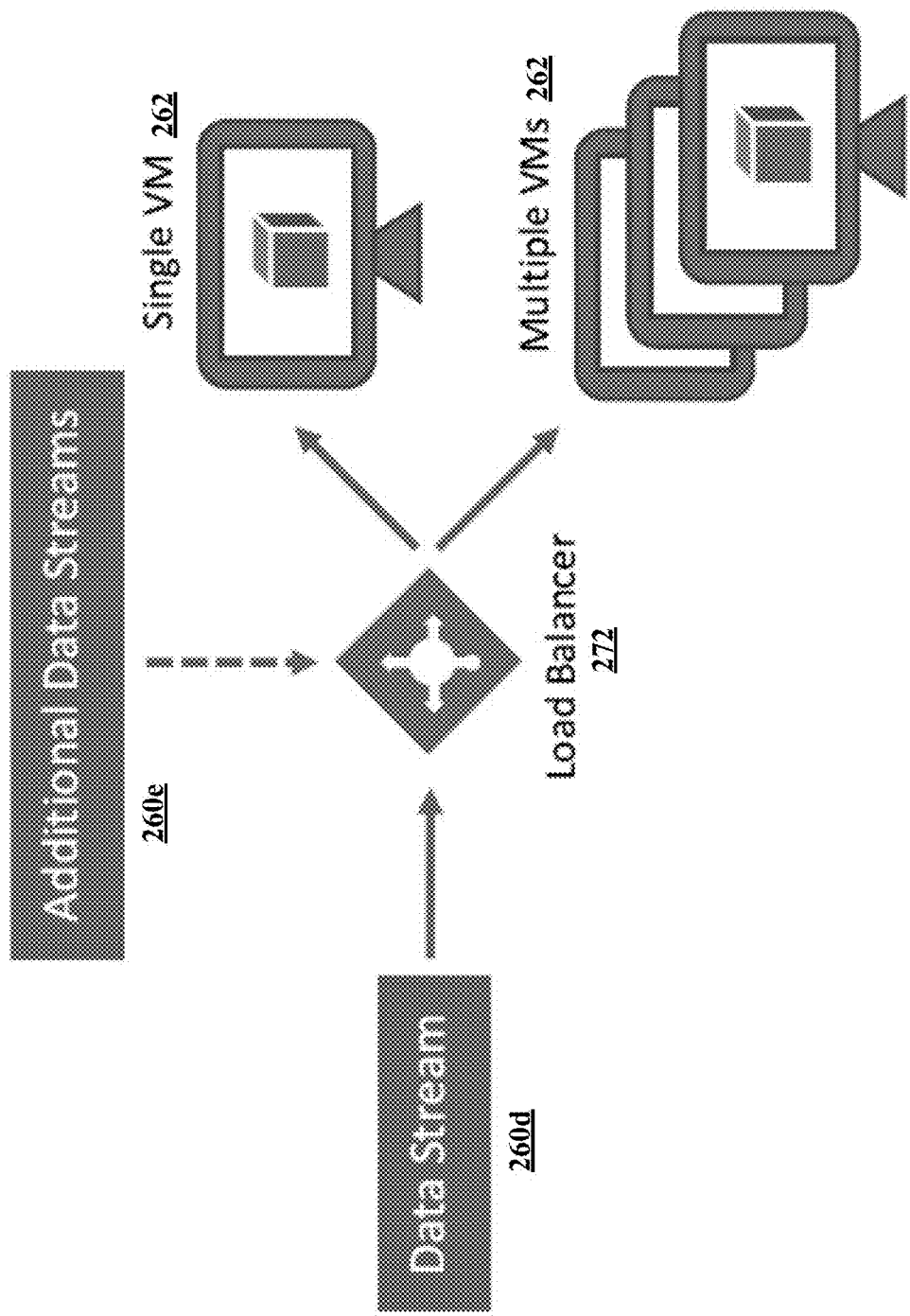
FIG. 2J is a block diagram illustrating an example, non-limiting implementation of the system of FIG. 2I in accordance with various aspects described herein.

FIG. 2J is a block diagram illustrating an example, non-limiting implementation 270 of the system 260 of FIG. 2I in accordance with various aspects described herein. In exemplary embodiments, the implementation 270 may include one or more load balancers 272 configured to perform workload distribution by managing instantiation of VMs 262 according to need or demand. In various embodiments, the load balancer 272 may monitor data streams and/or the volume thereof, and adjust the number of instantiated VMs 262 based on the monitoring. For instance, in a case where the load balancer 272 detects an increase in the number of data streams (e.g., additional data streams 260*e*), the load balancer 272 may instantiate additional (or new) VMs 262 to distribute the increased workload. In a case where the load balancer 272 detects a decrease in the number of data streams to be processed, the load balancer 272 may shutdown (or discard) one or more existing VMs 262 to conserve resources. In one or more embodiments, the load balancer 272 may monitor VM capacity (for over-capacity or under-capacity based on a threshold capacity), and adjust the number of instantiated VMs 262 and/or reassign data streams to other VMs 262 based on the monitoring. For example, in a case where the load balancer 272 determines that a particular VM 262 is being overworked (e.g., is processing more than a threshold number of streams) and/or that a volume of a stream exceeds a threshold volume, the load balancer 272 may instantiate additional (or new) VMs 262 to offload some of the processing from the particular VM 262. In a case where the load balancer 272 determines that a given VM 262 has available bandwidth (e.g., is processing less than or equal to the threshold number of streams) and/or that a volume of a stream is less than or equal to the threshold volume, the load balancer 272 may allocate or reassign one or more data streams (e.g., from an overworked VM 262) to the given VM 262. In this way, the load balancer 272 may "spin up" or shutdown VMs 262 as needed based on compute resources available on different VMs.

Separating or decoupling stream processing from anomaly model maintenance/updating, as described herein, modularizes the overall system such that changes in anomaly detection/alerting models may be made without affecting stream-processing modules, and vice versa. When stream processing VMs 262 are shut down, for instance, anomaly detection/alerting models are not lost. Similarly, when cloning stream-processing VMs 262 or deploying new VMs 262, there is no risk of using anomaly detection/alerting models that are outdated. The modular architecture, with a centralized storage, enables the anomaly detection/alerting system to operate on each VM 262 independently and on distinct data feeds. Data outputs generated by each anomaly detection/alerting system may be saved to the centralized storage, thereby enabling aggregation of alert data in a single location for more efficient consumption or usage. Furthermore, spanning new VMs 262 for processing additional (or new) streams becomes simplified, since there is no need for replication of the anomaly detection/alerting models and no need to separately ensure that the models are actually up to date. Spanning new VMs for model management can also be done independently of the stream-processing tasks, without increasing the load on the already-busy stream-processing VMs 262.

It is to be appreciated and understood that, where FIGS. 2I and 2J is described above as pertaining to various processes and/or actions that are performed in a particular order, some of these processes and/or actions may occur in different orders and/or concurrently with other processes and/or actions. Moreover, not all of these processes and/or actions may be required to implement the systems and/or methods described herein.

It is also to be appreciated and understood that the quantity and arrangement of resource groups, machines, databases, dashboards, and/or load balancers, shown in one or more of FIGS. 2I and 2J are provided as examples. In practice, there may be additional resource groups, machines, databases, dashboards, and/or load balancers, different resource groups, machines, databases, dashboards, and/or load balancers, or differently arranged resource groups, machines, databases, dashboards, and/or load balancers than those shown in FIGS. 2I and 2J. For example, each of the systems 260 and 270 can include more or fewer resource groups, machines, databases, dashboards, and/or load balancers, etc. In practice, therefore, there can be hundreds, thousands, millions, billions, etc. of such resource groups, machines, databases, dashboards, and/or load balancers. In this way, the example systems can coordinate, or operate in conjunction with, a set of resource groups, machines, databases, dashboards, and/or load balancers and/or operate on data sets that cannot be managed manually or objectively by a human actor. Furthermore, two or more resource groups, machines, databases, dashboards, or load balancers shown in one or more of FIGS. 2I and 2J may be implemented within a single resource group, machine, database, dashboard, or load balancer, or a single resource group, machine, database, dashboard, or load balancer shown in one or more of FIGS. 2I and 2J may be implemented as multiple resource groups, machines, databases, dashboards, or load balancers. Additionally, or alternatively, a set of resource groups, machines, databases, dashboards, or load balancers may perform one or more functions described as being performed by another set of resource groups, machines, databases, dashboards, or load balancers.

Figure 2K:
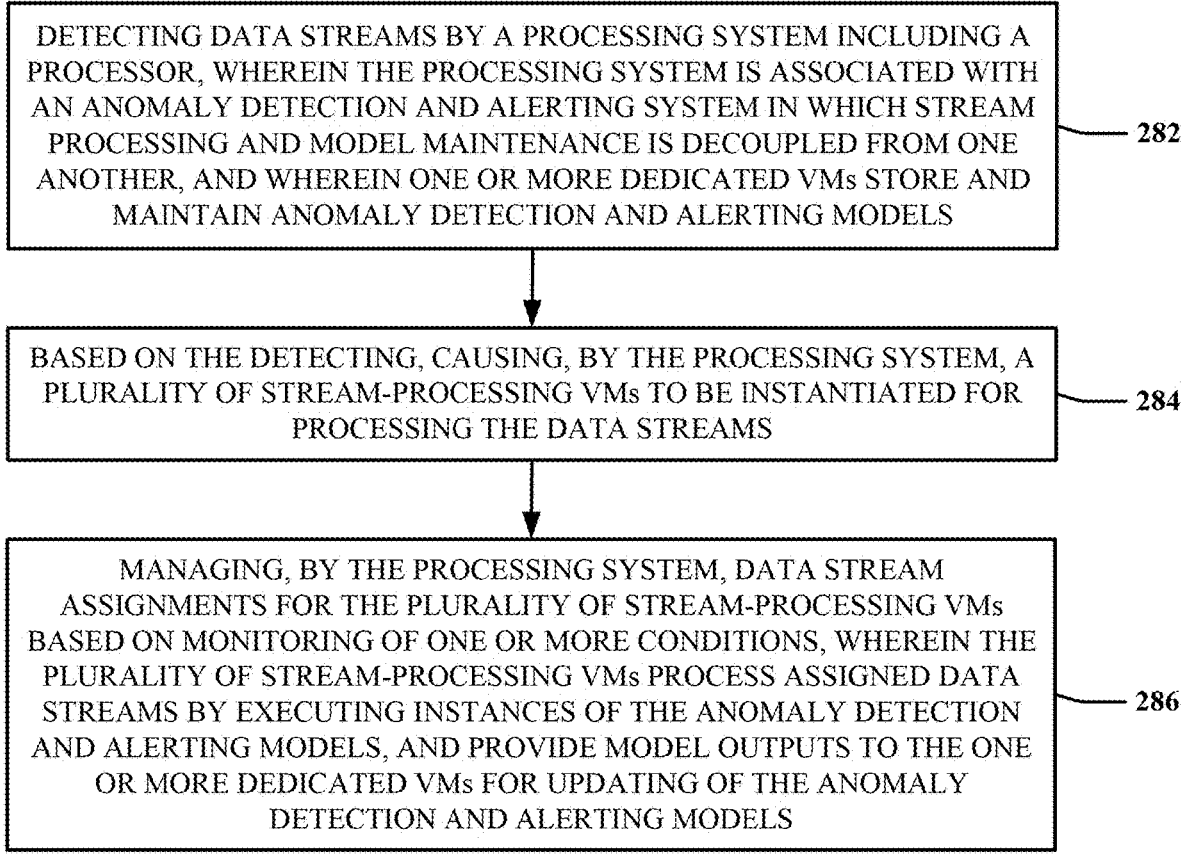
FIG. 2K depicts an illustrative embodiment of a method in accordance with various aspects described herein.

FIG. 2K depicts an illustrative embodiment of a method 280 in accordance with various aspects described herein. In some embodiments, one or more process blocks of FIG. 2K can be performed by a load balancer, such as the load balancer 272. In some embodiments, one or more process blocks of FIG. 2K may be performed by another device or a group of devices separate from or including the load balancer 272.

At 282, the method can include detecting data streams by a processing system including a processor, wherein the processing system is associated with an anomaly detection and alerting system in which stream processing and model maintenance is decoupled from one another, and wherein one or more dedicated virtual machines (VMs) store and maintain anomaly detection and alerting models. For example, the load balancer 272 can, similar to that described elsewhere herein, perform one or more operations that include detecting data streams, wherein the load balancer 272 is associated with an anomaly detection and alerting system in which stream processing and model maintenance is decoupled from one another, and wherein one or more dedicated VMs store and maintain anomaly detection and alerting models.

At 284, the method can include, based on the detecting, causing, by the processing system, a plurality of stream-processing VMs to be instantiated for processing the data streams. For example, the load balancer 272 can, similar to that described elsewhere herein, perform one or more operations that include, based on the detecting, causing a plurality of stream-processing VMs to be instantiated for processing the data streams.

At 286, the method can include managing, by the processing system, data stream assignments for the plurality of stream-processing VMs based on monitoring of one or more conditions, wherein the plurality of stream-processing VMs process assigned data streams by executing instances of the anomaly detection and alerting models, and provide model outputs to the one or more dedicated VMs for updating of the anomaly detection and alerting models. For example, the load balancer 272 can, similar to that described elsewhere herein, perform one or more operations that include managing data stream assignments for the plurality of stream-processing VMs based on monitoring of one or more conditions, wherein the plurality of stream-processing VMs process assigned data streams by executing instances of the anomaly detection and alerting models, and provide model outputs to the one or more dedicated VMs for updating of the anomaly detection and alerting models.

In some implementations of these embodiments, the one or more dedicated VMs provide a shared database for the plurality of stream-processing VMs.

In some implementations of these embodiments, the one or more conditions relate to number of data streams to be processed, data stream volumes, workload of one or more of the plurality of stream-processing VMs, or a combination thereof.

In some implementations of these embodiments, the anomaly detection and alerting models comprise a baseline alerting algorithm configured to generate alerts for anomalies in a given data stream at a predefined time unit of measurement, resulting in baseline alerts. In some implementations of these embodiments, the anomaly detection and alerting models further comprise a super alerting algorithm configured to generate alerts based on at least one of persistence and pervasiveness of the baseline alerts, resulting in super alerts. In some implementations of these embodiments, the anomaly detection and alerting models further comprise a smart alerting algorithm configured to generate alerts based on at least one of priority, anomaly persistence, and pervasiveness of the super alerts over multiple data streams or dimensions, resulting in smart alerts.

While for purposes of simplicity of explanation, the respective processes are shown and described as a series of blocks in FIG. 2K, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communications network in accordance with various aspects described herein. In particular, a virtualized communications network is presented that can be used to implement some or all of the subsystems and functions of system 100, the subsystems and functions of systems 260 and 270, and method 280 presented in FIGS. 1 and 2I-2K. For example, virtualized communications network 300 can facilitate, in whole or in part, cloud-based (or cloud-first)

anomaly detection and alerting over streaming data, where anomaly detection models and data stream processing are decoupled from one another.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communications network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
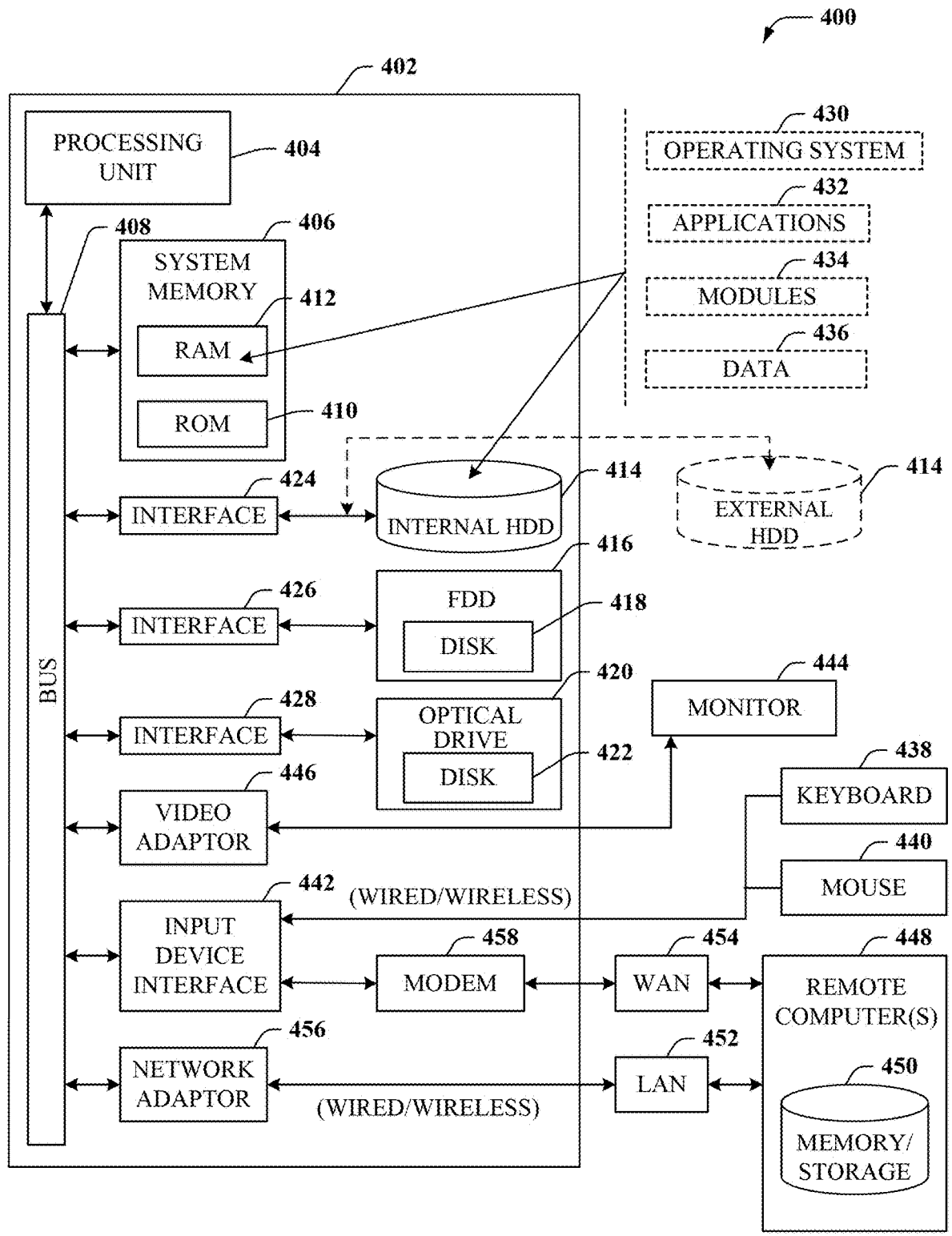
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate, in whole or in part, cloud-based (or cloud-first) anomaly detection and alerting over streaming data, where anomaly detection models and data stream processing are decoupled from one another.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communications network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
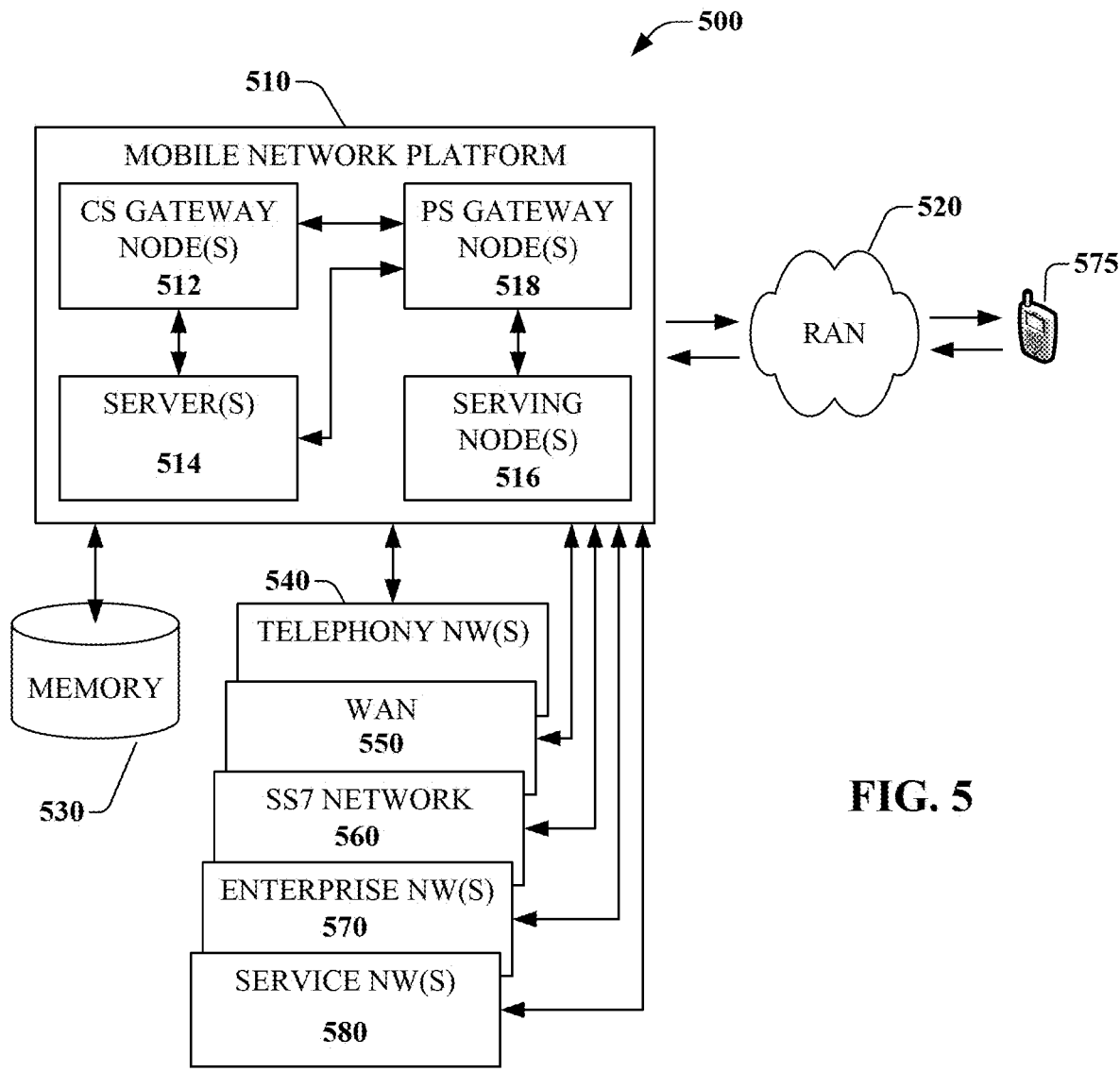
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate, in whole or in part, cloud-based (or cloud-first) anomaly detection and alerting over streaming data, where anomaly detection models and data stream processing are decoupled from one another. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as distributed antenna networks that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
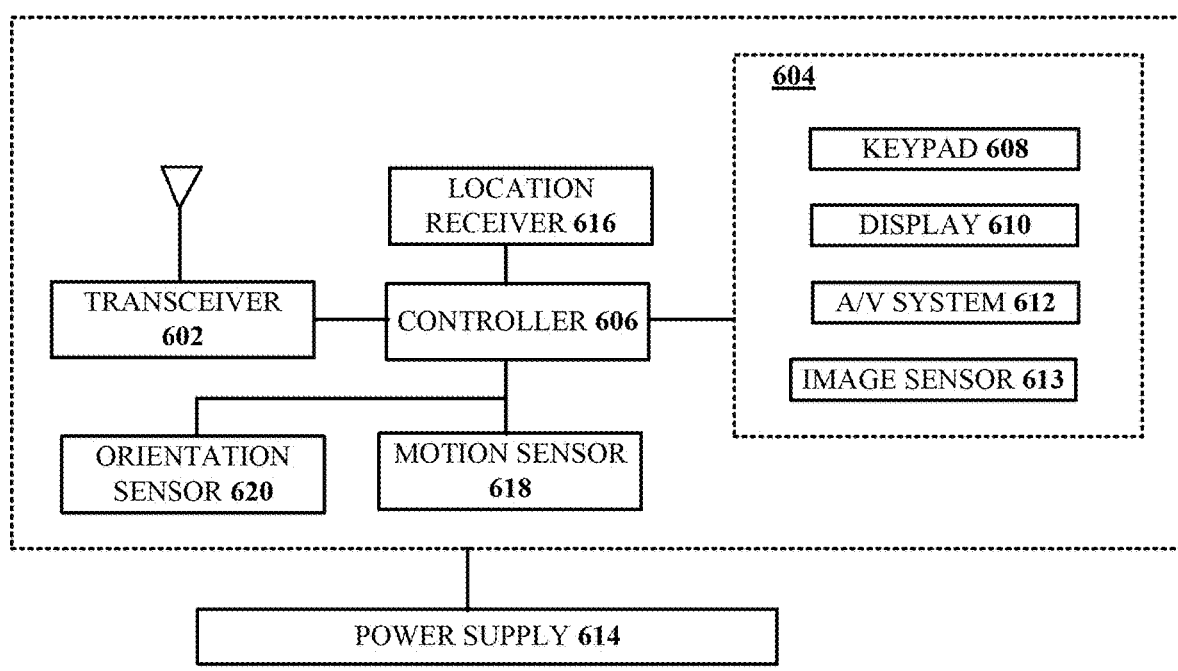
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via communications network 125. For example, computing device 600 can facilitate, in whole or in part, cloud-based (or cloud-first) anomaly detection and alerting over streaming data, where anomaly detection models and data stream processing are decoupled from one another.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communications network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x)= confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communications network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A system, comprising:
a cloud computing environment configured to provide one or more dedicated virtual machines (VMs) for storing and managing anomaly detection and alerting models;
a device configured to control the cloud computing environment to perform instantiation and shutdown of stream-processing VMs based on a number of data streams to be processed, data stream volumes, workload of the stream-processing VMs, or a combination thereof, wherein the stream-processing VMs process assigned data streams by executing instances of the anomaly detection and alerting models, and provide model outputs to the one or more dedicated VMs for maintenance or updating of the anomaly detection and alerting models, and wherein the stream-processing VMs are distinct from the one or more dedicated VMs, thereby providing an anomaly detection and alerting architecture in which stream processing is decoupled from model maintenance and updating; and
wherein a first anomaly detection and alerting model of the anomaly detection and alerting models is configured to generate a first alert based on a first persistence or a first pervasiveness determined from a given data stream at a predefined time unit of measurement, and further comprises a super alerting algorithm configured to generate a second alert based on at least one of a second persistence or a second pervasiveness of the first alert, resulting in a first super alert.

2. The system of claim 1, wherein the one or more dedicated VMs provide a shared database for the stream-processing VMs.

3. The system of claim 1, wherein the one or more dedicated VMs do not perform any data stream processing.

4. The system of claim 1, wherein the device comprises a load balancer.

5. The system of claim 1, wherein the first anomaly detection and alerting model of the anomaly detection and alerting models comprises a baseline alerting algorithm configured to generate the first alert, resulting in a first baseline alert.

6. The system of claim 5, wherein the super alerting algorithm is further configured to apply a voting mechanism to determine whether the second persistence or the second pervasiveness of the first alert meet a threshold for generating the second alert.

7. The system of claim 1, wherein the first anomaly detection and alerting model of the anomaly detection and alerting models further comprises a smart alerting algorithm configured to generate a third alert based on a priority, an anomaly persistence, or a pervasiveness of the first super alert over multiple data streams or dimensions, resulting in one or more smart alerts.

8. The system of claim 1, wherein instantiation of a stream-processing VM comprises unpackaging of a container.

9. The system of claim 8, wherein the container is generated to include an anomaly detection and alerting application comprising the instances of the anomaly detection and alerting models.

10. The system of claim 9, wherein the instances of the anomaly detection and alerting models are up-to-date versions of the anomaly detection and alerting models that are maintained by the one or more dedicated VMs based on model outputs provided by various stream-processing VMs.

11. A non-transitory machine-readable medium, comprising executable instructions that, when executed by a processing system including a processor, facilitate performance of operations, the operations comprising:
   detecting data streams to be processed;
   based on the detecting, causing a cloud resource environment to provide a group of cloud-based resources to process the data streams, the group of cloud-based resources comprising a plurality of stream-processing virtual machines (VMs) for processing the data streams, and one or more dedicated VMs for storing and managing anomaly detection and alerting models, wherein the plurality of stream-processing VMs are separate from the one or more dedicated VMs;
   based on monitoring of one or more conditions, controlling the cloud resource environment to perform shutdown of select stream-processing VMs of the plurality of stream-processing VMs or to adjust data stream processing assignments for the plurality of stream-processing VMs, wherein the plurality of stream-processing VMs process assigned data streams by executing instances of the anomaly detection and alerting models, and provide model outputs to the one or more dedicated VMs for maintenance of the anomaly detection and alerting models; and
   wherein a first anomaly detection and alerting model of the anomaly detection and alerting models is configured to generate a first alert based on a first persistence determined from a given data stream at a predefined time unit of measurement, and further comprises a super alerting algorithm configured to generate a second alert based on at least one of a second persistence or a second pervasiveness of the first alert, resulting in a first super alert.

12. The non-transitory machine-readable medium of claim 11, wherein the one or more conditions relate to number of data streams to be processed, data stream volumes, workload of one or more of the plurality of stream-processing VMs, or a combination thereof.

13. The non-transitory machine-readable medium of claim 11, wherein the first anomaly detection and alerting model of the anomaly detection and alerting models comprises a baseline alerting algorithm configured to generate a first alert, resulting in a first baseline alert.

14. The non-transitory machine-readable medium of claim 11, wherein the super alerting algorithm is further configured to apply a voting mechanism to determine whether the second persistence or the second pervasiveness of the first alert meet a threshold for generating the second alert.

15. The non-transitory machine-readable medium of claim 11, wherein the first anomaly detection and alerting model of the anomaly detection and alerting models further comprises a smart alerting algorithm configured to generate a third alert based on a priority or the second persistence of the first super alert over multiple data streams or dimensions, resulting in one or more smart alerts.

16. A method, comprising:
   detecting data streams by a processing system including a processor, wherein the processing system is associated with an anomaly detection and alerting system in which stream processing and model maintenance is decoupled from one another, and wherein one or more dedicated virtual machines (VMs) store and maintain anomaly detection and alerting models;
   based on the detecting, causing, by the processing system, a plurality of stream-processing VMs to be instantiated for processing the data streams;
   managing, by the processing system, data stream assignments for the plurality of stream-processing VMs based on monitoring of one or more conditions, wherein the plurality of stream-processing VMs process assigned data streams by executing instances of the anomaly detection and alerting models, and provide model outputs to the one or more dedicated VMs for updating of the anomaly detection and alerting models; and
   wherein a first anomaly detection and alerting model of the anomaly detection and alerting models is configured to generate a first alert based on a first pervasiveness determined from a given data stream at a predefined time unit of measurement, and further comprises a super alerting algorithm configured to generate a second alert based on at least one of a second persistence or a second pervasiveness of the first alert, resulting in a first super alert.

17. The method of claim 16, wherein the one or more dedicated VMs provide a shared database for the plurality of stream-processing VMs.

18. The method of claim 16, wherein the processing system comprises a load balancer.

19. The method of claim 16, wherein the one or more conditions relate to number of data streams to be processed, data stream volumes, workload of one or more of the plurality of stream-processing VMs, or a combination thereof.

20. The method of claim 16, wherein the first anomaly detection and alerting model of the anomaly detection and alerting models comprises:
   a baseline alerting algorithm configured to generate a first alert, resulting in a first baseline alert; and a smart alerting algorithm configured to generate a third alert based on a priority, or the second pervasiveness of the first super alert over multiple data streams or dimensions, resulting in one or more smart alerts.

\* \* \* \* \*